W. H. McLAUGHLIN.
CLAMP.
APPLICATION FILED JAN. 3, 1916.
1,247,437.
Patented Nov. 20, 1917.
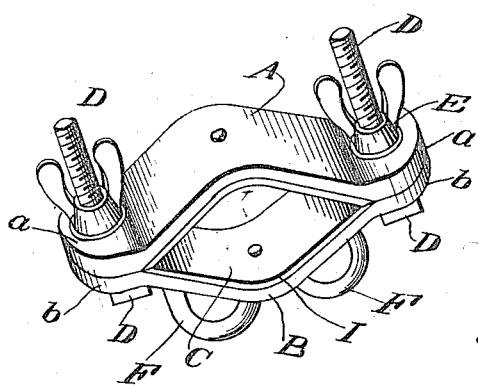
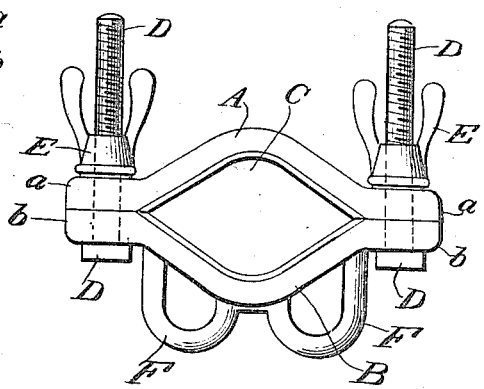
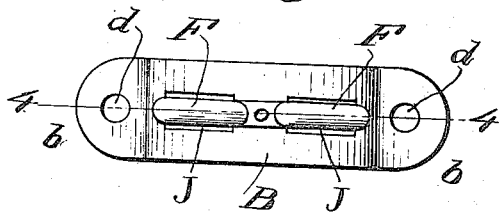
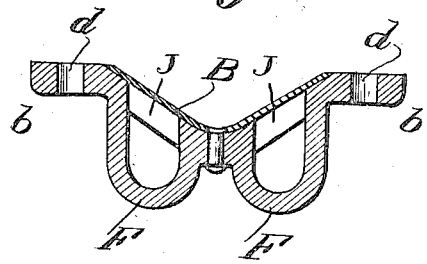
Inventor
William H. McLaughlin
By Wm H Babcock & Son
Attorneys

UNITED STATES PATENT OFFICE.

WILLIAM H. McLAUGHLIN, OF LANCASTER, PENNSYLVANIA, ASSIGNOR, BY MESNE ASSIGNMENTS, TO CASSIUS S. CHASE, OF HARTFORD, CONNECTICUT.

CLAMP.

1,247,437. Specification of Letters Patent. Patented Nov. 20, 1917.

Application filed January 3, 1916. Serial No. 69,863.

*To all whom it may concern:*

Be it known that I, WILLIAM H. McLAUGHLIN, a citizen of the United States, residing at Lancaster, in the county of Lancaster and State of Pennsylvania, have invented certain new and useful Improvements in Clamps, of which the following is a specification.

This invention relates to clamps fitting on the spokes of automobile and other vehicle wheels and adapted to the attachment of anti-skid devices for rubber tires; and also useful or adapted to service in many places where it is desired to attach one or more flexible connections to a part by means of a collar or clamp, and it consists in the construction and combination of parts hereinafter more particularly set forth and claimed.

In the accompanying drawings:

Figure 1 represents a perspective view of a clamp embodying my invention;

Fig. 2, a top plan view of the same not showing the rivets;

Fig. 3, a side elevation of clamp member B; and

Fig. 4 is a sectional view on the line 4—4 of Fig. 3.

A and B designate respectively the two clamp members or plates constituting the body of my improved clamp, the same having reversely bent outlines in the middle part of the clamp to provide an opening C for fitting on or around a spoke. The end parts $a$ and $b$ of this clamp are flat, fit snugly together and are provided with registering holes $d$, through which fastening bolts D are passed, receiving thumb nuts E in the usual way. Said opening C and the cross-section of the said spoke will be elliptical in many instances, as said opening is shown, although it may also be angular or of other form.

The clamp plate B is provided on the back or external face with a pair of rigid loops F, which are preferably near each other, as shown in Figs. 1, 2, 3 and 4. One of these loops is arranged on each side of the middle point of the length of said plate. The ends of an anti-skid chain may be conveniently attached to these loops, one end to each loop, the middle part of the chain being held tightly on the tire. The same is true of any substitute anti-skid device having means of attachment to said loops.

Openings J are made in said plate behind each loop and between its ends to provide extra space for attaching the ends of the anti-skid chains.

The plate A has no loops and of course the plate B might be used with any plate permitting the attachment of the two plates securely together and providing for clamping a spoke between them. Thus, any injury to plate A will not make the loop-carrying plate B useless unless fitted to a duplicate of plate A, as would be the case if one of the loops were on plate A and the other on plate B. The two loops, projecting as they do laterally and preferably about at right angles to the longitudinal central line of the clamp between the flat parts $b$, are necessarily located when in use in the space between two spokes of the wheel and between the vertical planes of the two sides of the rim or tire, so that, when the wheel revolves, they will not strike against any adjacent parts of the vehicle, which cannot be said of clamps having parts projecting laterally beyond said planes. Also, being brought close together in the middle part of the clamp member B, my pair of loops F provide for the narrowest feasible loop of the anti-skid chain, which will consequently be bound more tightly on the tire than if the fastening ends of said chain were more widely separated.

Neither the spoke, tire, chain, nor any other part of the wheel has been shown in the drawings as they form no part of my invention; and the application of the clamp seems obvious without further illustration. I contemplate the use of the clamp with any ordinary form of wheel employing tires needing anti-skid devices.

Having thus described my invention, what I claim as new and desire to secure by Letters Patent is:

A clamp for anti-skid devices, consisting of a pair of plates arranged opposite each other and means for holding them together, one of said plates being provided with a loop presented laterally therefrom for the attachment of an anti-skid device and with an opening in said plate between the legs of said loop to make more room for such attachment.

In testimony whereof, I have signed my name to this specification in the presence of two subscribing witnesses.

WILLIAM H. McLAUGHLIN.

Witnesses:
M. G. WEAVER,
A. S. HERSBERG.

Copies of this patent may be obtained for five cents each, by addressing the "Commissioner of Patents, Washington, D. C."